United States Patent [19]

Platt et al.

[11] Patent Number: 5,075,347

[45] Date of Patent: * Dec. 24, 1991

[54] METHOD FOR THE PREPARATION OF HYDROPEROXIDE DERIVATIVES OF RUBBERY POLYMERS

[75] Inventors: Alan E. Platt; Jerry L. Hahnfeld; David A. Habermann, all of Midland, Mich.

[73] Assignee: The Dow Chemical Company, Midland, Mich.

[ * ] Notice: The portion of the term of this patent subsequent to Jan. 5, 2005 has been disclaimed.

[21] Appl. No.: 300,506

[22] Filed: Jan. 23, 1989

Related U.S. Application Data

[63] Continuation of Ser. No. 933,836, Nov. 24, 1986, abandoned, which is a continuation-in-part of Ser. No. 668,581, Nov. 5, 1984, abandoned.

[51] Int. Cl.$^5$ .............................. C08F 2/50; C08F 8/06; C08F 279/04; C08F 279/02
[52] U.S. Cl. ........................................ 522/63; 522/78; 522/79; 522/116; 522/120; 522/129; 525/244; 525/315; 525/388
[58] Field of Search .................... 522/63, 31, 79, 116, 522/120, 129

[56] References Cited

U.S. PATENT DOCUMENTS

| | | | |
|---|---|---|---|
| 3,081,242 | 3/1963 | Smith | 522/129 |
| 3,115,418 | 12/1963 | Magat | 522/124 |
| 3,252,880 | 5/1966 | Magat | 522/125 |
| 3,484,353 | 12/1969 | Sharp | 522/129 |
| 3,846,266 | 11/1974 | Duynstee | 522/129 |
| 3,925,076 | 12/1975 | Heimsch | 522/129 |
| 4,183,878 | 1/1980 | Biletech | 525/86 |
| 4,717,741 | 1/1988 | Hahnfeld | 522/116 |

*Primary Examiner*—Marion E. McCamish
*Assistant Examiner*—Arthur H. Koeckert

[57] ABSTRACT

An improved process for forming hydroperoxide derivatives of rubbery polymers. The hydroperoxide derivatives being particularly well suited for use as intermediates in forming graft rubbery polymers. The process involves dissolving a rubbery polymer in a monomer mixture and adding to the rubbery polymer/monomer mixture a photosensitizing agent. The rubbery polymer-monomer mixture is then oxygenated and exposed to light under conditions wherein triplet oxygen is converted to singlet oxygen. The improvement comprises adding to the rubbery polymer/monomer mixture a solvent capable of solubilizing the photosensitizing agent in the rubbery polymer/monomer mixutre. The solubilizer increases the yield of hydroperoxide derivatives of rubbery polymers formed by a factor of 3.

30 Claims, No Drawings

METHOD FOR THE PREPARATION OF HYDROPEROXIDE DERIVATIVES OF RUBBERY POLYMERS

CROSS-REFERENCE TO RELATED APPLICATIONS

This is a continuation of application Ser. No. 933,836 which was filed on Nov. 24, 1986, now abandoned which is a continuation-in-part of application Ser. No. 668,581; filed Nov. 5, 1984, now abandoned.

BACKGROUND OF THE INVENTION

This invention relates to a process for the formation of hydroperoxide derivatives of rubbery polymers via singlet oxygen. Specifically, it relates to a process for the formation of grafted rubbery polymers through the formation of a hydroperoxidized rubbery polymer intermediate.

Prior processes for the production of hydroperoxide derivatives of polymers are known in the art, but have proven unsatisfactory in practice.

U.S. Pat. No. 3,484,353, to Dexter Sharp, discloses such a process. Sharp teaches a method for forming hydroperoxide derivatives of polymers having ethylenic unsaturation in the polymer backbone.

U.S. Pat. No. 3,846,266, to Eduard Duynstee et al., also discloses such a process. Duynstee et al. teach a method for forming hydroperoxide derivatives of polymers having ethylenic unsaturation pendant to the polymer backbone chain.

Both of the cited patents teach the formation of the hydroperoxide derivatives through exposing the polymer to light in the presence of a photosensitizing agent and oxygen. Similarly, both teach that the polymer can be in a dissolved state during the formation of the hydroperoxide derivatives. When forming grafted rubbery polymers, it is particularly desirable to form the hydroperoxide derivatives with the rubbery polymer dissolved directly in the monomers to be grafted thereto. Dissolving the rubbery polymers in the monomers to be grafted thereto prior to forming the hydroperoxide derivatives presents a hitherto unsolved problem. Oftimes, the photosensitizing agent is not sufficiently soluble in the monomers to produce an adequate degree of hydroperoxidation on the rubbery polymer. Neither of the patents teach a method for solubilizing the photosensitizing agent in the monomer/polymer solution. It would be desirable to achieve solubilization of the photosensitizer in the monomer/polymer solution without precipitating the polymer out of solution. It is to this goal that the present invention is directed.

SUMMARY OF THE INVENTION

The present invention concerns an improved process for the preparation of hydroperoxide derivatives of rubbery polymers having allylic hydrogen. The steps of the process comprise:

(a) forming a polymerizable mixture comprising one or more free-radically polymerizable monomers;
(b) dissolving a rubbery polymer having allylic hydrogen in the polymerizable mixture to form a rubber-containing polymerizable solution;
(c) adding to the rubber-containing polymerizable solution, a photosensitizing amount of a photosensitizing agent;
(d) oxygenating the rubber-containing polymerizable solution;
(e) exposing the oxygenated rubber-containing polymerizable solution to light having a wavelength between 3,000 and 8,000 Angstroms, wherein triplet oxygen is converted to singlet oxygen; wherein the improvement comprises adding to the rubber-containing polymerizable solution an amount of solubilizer sufficient to solubilize the photosensitizing agent in the rubber-containing polymerizable solution, wherein the solubilizer increases the yield of hydroperoxide derivatives of rubbery-polymers formed by a factor of at least 3, the solubilizer being selected from the group consisting of methanol, ethanol, acetonitrile, ethylacetate, acrylonitrile, ethylene glycol, ortho-dichlorobenzene, and dimethyl-sulfoxide.

DETAILED DESCRIPTION OF THE INVENTION

The present invention claims an improved process for the preparation of hydroperoxide derivatives of rubbery polymers.

The hydroperoxide derivatives of the present invention are well-suited for use as precursors in the production of graft copolymers. When the hydroperoxide derivatives of the present invention are used in the production of graft copolymers, the hydroperoxide groups present on the rubbery polymers provide grafting sites for the monomer being grafted thereto. By controlling the number of hydroperoxide groups formed on the rubbery polymer of the present invention one is able to control the amount of subsequent grafting.

The hydroperoxide derivatives of the present invention are prepared in solution, preferably through a continuous process. Because of the desirability of forming graft copolymers from the hydroperoxide derivatives of the present invention, the rubbery polymers are dissolved in a polymerizable mixture of one or more free-radically polymerizable monomers. Said polymerizable mixture is chosen such that the monomers present therein are suitable for subsequent grafting to the hydroperoxide derivatives of the present invention.

A wide variety of monomeric materials may be employed in the polymerizable mixture of the present invention. Suitable, are the monovinylidene aromatic monomers. Exemplary monovinylidene aromatic monomers include; styrene, aralkylstyrene, such as the o-, m-, and p-methylstyrenes, 2,4-dimethylstyrene, the arethylstyrenes, p-butylstyrene, etc.; alpha-alkyl monovinylidene monoaromatic compounds (e.g., alpha-methylstyrene, alpha-ethylstyrene, etc.); ring substituted alkyl/styrenes (e.g., ortho-meta- and para-vinyl toluene; o-ethylstyrene; p-ethylstyrene; 2,4-dimethylstyrene; p-tertiary butylstyrene; etc.); ring-substituted halostyrenes (e.g., o-chlorostyrene, p-chlorostyrene, o-bromostyrene, 2,4-dichlorostyrene, etc.); ring alkyl, ring-halo-substituted styrenes (e.g., 2-chloro-4-methylstyrene, 2,6-dichloro-4-methylstyrene, etc.); vinyl naphthalene; vinyl anthracene, etc. The alkyl substituents generally have one to four carbon atoms and may include isopropyl and isobutyl groups. If desired, mixtures of one or more of such monovinylidene monomers may be used.

Also suitable for use in the polymerizable mixture are free-radically polymerizable olefinically unsaturated monomers. Examples of suitable free-radically polymerizable olefinic monomers include methyl methacrylate, ethyl methacrylate, and the like; acrylonitrile, methacrylonitrile, ethacrylonitrile, and the like; and ethylene, propylene, and the like.

Preferred monomers for use in the polymerizable mixture are styrene, acrylonitrile, and methyl methacrylate.

In one preferred embodiment of the present invention the polymerizable mixture comprises styrene and acrylonitrile. In this preferred embodiment the weight ratio of styrene to acrylonitrile varies from about 95 to 5 to about 40 to 60.

After forming the polymerizable mixture, a rubbery polymer is dissolved therein. The rubbery polymer possesses allylic hydrogen. The allylic hydrogen may be present either in the backbone, pendant to the backbone, or in both.

The term "rubbery polymer" is intended to encompass those polymers having a glass temperature of not higher than 0° C., preferably not higher than −20° C., as determined by ASTM D-756-52T. Suitable rubbers include the diene rubbers and the EPDM rubbers. Examples of suitable diene rubbers include mixtures of one or more conjugated 1,3-dienes, e.g., butadiene, isoprene, piperylene, chloroprene, etc. Suitable rubbers include homopolymers of conjugated 1,3-dienes and interpolymers of conjugated 1,3-dienes with one or more copolymerizable monoethylenically unsaturated monomers, e.g., copolymers of isobutylene and isoprene.

Examples of suitable copolymerizable monoethylenically unsaturated monomers include the monovinylidene aromatic hydrocarbons (e.g., styrene, aralkylstyrene, such as the o-, m- and p-methylstyrenes, 2,4-dimethylstyrene, the ar-ethylstyrenes, p-butylstyrene, etc.; and alpha-alkylstyrene, such as alpha-methylstyrene, alpha-ethylstyrene, alpha-methyl-p-methylstyrene, etc.; vinylnaphthalene, etc.); ar-halo-monovinylidene aromatic hydrocarbons (e.g., o-, m- and p-chlorostyrenes, 2,4-dibromostyrene, 2-methyl-4-chlorostyrene, etc.); acrylonitrile, methacrylonitrile, alkyl acrylates (e.g., methylacrylate, butyl acrylate, ethylhexyl acrylate, etc.), the corresponding alkyl methacrylates, acrylamides, (e.g., acrylamide, methylacrylamide, N-butylacrylamide, etc.); unsaturated ketones (e.g., vinyl methyl ketone, methyl isopropenyl ketone, etc.); alpha-olefins (e.g., ethylene, propylene, etc.); vinyl esters (e.g., vinyl acetate, vinyl stearate, etc.); vinyl and vinylidene halides (e.g., the vinyl and vinylidene chlorides, and bromides, etc.); and the like.

In one preferred embodiment of the present invention, the rubbery polymer is a homopolymer of 1,3-butadiene.

In another preferred embodiment of the present invention the rubbery polymer is a terpolymer of a first α-olefin monomer, a second different α-olefin monomer and a non-conjugated diolefin monomer. The first α-olefin monomer has from 2 to 4 carbon atoms. The second α-olefin monomer has from 3 to 16 carbon atoms. The number of carbon atoms in the first α-olefin monomer is different than the number of carbon atoms present in the second α-olefin monomer. Exemplary of the terpolymers of this embodiment of the present invention are terpolymers of ethylene, propylene and a non-conjugated diolefin monomer (e.g., 5-ethylidene-2-norbornene). Such terpolymers are generally known in the art as EPDM rubbers.

Suitably, the rubbery polymer is present in an amount of from about 2 to about 30 percent by weight of the polymerizable mixture. Preferably, the rubbery polymer is present in an amount of from about 1 to about 20 percent by weight of the polymerizable mixture.

A photosensitizing agent is added to the rubber-containing polymerizable solution. The photosensitizing agent is added in an amount sufficient to photosensitize the rubber-containing polymerizable solution. Generally, the photosensitizer is added in an amount of from about $1 \times 10^{-4}$ to about $1 \times 10^{-1}$ weight percent based on total rubber containing polymerizable solution weight.

A number of photosensitizing agents are suitable for use in the present invention. Exemplary of the suitable photosensitizers are methylene blue, Rose Bengal, Eosin Y, and Erythrosin B.

In one preferred embodiment of the present invention, the rubbery polymer is a homopolymer of 1,3-butadiene, the preferred photosensitizing agent is methylene blue.

In another preferred embodiment of the present invention, the rubbery polymer is an EPDM rubber and the preferred photosensitizing agent is methylene blue.

In many situations, depending on the composition of the rubber-containing polymerizable solution, the photosensitizing agent will not completely dissolve in the rubber-containing polymerizable solution. In these situations, hydroperoxidation of the rubbery polymers is substantially retarded. It is the solution to this problem which represents the essence of the present invention.

It has been found desirable to employ a solubilizer for the photosensitizing agents in those situations in which the photosensitizing agent will not completely dissolve in the rubber-containing polymerizable solution. The more completely the photosensitizing agent is dissolved in the rubber-containing polymerizable solution the faster the hydroperoxidation reaction proceeds.

The solubilizers suitable for use in the present invention are selected from the group consisting of methanol, ethanol, acetonitrile, ethylacetate, acrylonitrile, ethylene glycol, ortho-dichloro benzene and dimethyl sulfoxide. The solubilizers suitable for use in the present invention are capable of solvating molecules of the photosensitizing agent in the rubber-containing polymerizable solution. The improved solubilization of the photosensitizing agent in the rubber-containing polymerizable solution results in an increased yield of hydroperoxide derivatives of rubbery-polymers. Solubilizers suitable for use in the present invention must increase the amount of hydroperoxide derivatives of rubbery-polymers formed by a factor of at least 3 when compared to the same system without the solubilizer being present.

Generally, the solubilizer is employed in an amount of from about 0.1 to about 20 weight percent based on total weight polymerizable solution.

In one preferred embodiment of the present invention, the rubbery polymer is a homopolymer of a 1,3-butadiene, the photosensitizing agent is methylene blue and the solubilizer is methanol. Moreover, the methanol is present in an amount of from about 0.5 to about 5 weight percent based on total weight rubber-containing polymerizable solution.

In another preferred embodiment of the present invention, the rubbery polymer is an EPDM rubber, the photosensitizing agent is methylene blue and the solubilizer is methanol.

The rubber-containing polymerizable solution is exposed to oxygen a sufficient length of time to oxygenate it. Suitably, at least 2 micromoles of oxygen are dissolved in the rubber-containing polymerizable solution for each gram of rubbery polymer present therein. Preferably, the amount of oxygen dissolved in the rubber-containing polymerizable solution is from about 2 to about 200 micromoles for each gram of rubbery polymer present therein.

The rubber-containing polymerizable solution, in the presence of oxygen and photosensitizer, is exposed to light, having a wavelength between 3,000 and 8,000 Angstroms, for a length of time sufficient to convert triplet oxygen to singlet oxygen. Preferably, the light is visible light.

In one preferred embodiment of the present invention wherein the hydroperoxide derivative of the rubbery polymer is used as a precursor for forming a graft copolymer, the rubber-containing polymerizable solution is exposed to light for a length of time sufficient to form from about 0.5 to about 4 hydroperoxide groups on each rubbery polymer chain.

The exposure to light may be a single exposure or a plurality of exposures. The total length of exposure to light is dependent on a variety of factors including: amount of oxygen present, amount of photosensitizing agent present, concentration of the rubbery polymer in solution, and the number of hydroperoxide groups intended to be formed.

If the hydroperoxide derivatives of the present invention are to be used as precursors for the formation of graft copolymers the rubber-containing polymerizable solution is then polymerized.

Polymerization of the rubber-containing polymerizable solution is suitably initiated by cleaving the hydroperoxide groups present on the rubbery polymer chains. The hydroperoxide groups are cleaved between the oxygen atoms. Cleavage is suitably induced by heating to a temperature from about 80° C. to about 170° C. In one embodiment of the present invention cleavage of the hydroperoxide groups is induced by the presence of a redox initiation system, e.g., Ferrous Naphthanate, coupled with heating to a temperature of from about 40° C. to about 100° C.

Additionally, any free radical generating initiator or catalyst may be used in the polymerization of the rubber-containing polymerizable solution, including actinic radiation. Exemplary of suitable initiators and catalysts are di-tert-butyl peroxide, benzoyl peroxide, lauroyl peroxide, di-tert-butyl diperphthalate, tert-butyl peracetate, tert-butyl perbenzoate, dicumyl peroxide, tert-butyl peroxide, isopropyl carbonate, 2,5-dimethyl-2,5-di(tert-butylperoxy) hexane, 2,5-dimethyl-2,5-di(-tert-butylperoxy)hexyne-3, tert-butylhydroperoxide, cumeme hydroperoxide, p-methane hydroperoxide, cyclopentane hydroperoxide, diisopropylbenzene hydroperoxide, p-tert-butyl cumene hydroperoxide, pinane hydroperoxide, 2,5-dimethyl-hexane-2,5-dihydroperoxide, etc., and mixtures thereof.

If desired, small amounts of antioxidants may be included in the rubber-containing polymerizable solution. Examples of suitable antioxidants include alkylated phenols, e.g., di-tert-butyl-p-cresol; and phosphites such as trinonyl phenyl phosphite. In general, the antioxidants may be added at any stage during the polymerization of the rubber-containing polymerizable solution.

Optionally, a wide variety of diluents may be added to the rubber-containing polymerizable solution. Said optional diluent are generally present in an amount of less than 70 weight percent based on the total weight of the rubber containing polymerizable solution. Said diluents may be liquid materials which are generally nonreactive under polymerization conditions and act as a solvent for the polymer produced as well as for the starting monomer mixture. Examples of suitable diluents include ethylbenzene, toluene, benzene, and xylenes.

Polymerization of the rubber containing polymerizable solution is continued until achieving at least about 20 weight percent conversion of monomer to polymer. Preferably, polymerization of the rubber containing polymerizable solution is allowed to continue until achieving at least about 40 weight percent conversion of monomer to polymer.

After achieving the desired degree of conversion of monomer to polymer, polymerization of the rubber containing polymerizable solution is terminated. The resultant polymer is then recovered.

The present invention is further illustrated but not limited by the following examples. In the examples which follow, all weight percents are to within ±1.0 percent accuracy, therefore, the stated weight percents may not total 100.

EXAMPLE 1

A solution of 95 weight percent styrene and 5 weight percent of a polybutadiene rubber commercially available from the Firestone Rubber Company under the Trade designation Diene-55 ® is prepared. To this solution is added varying amounts of methylene blue and methanol. The resulting solutions are then exposed to visible light for varying lengths of time and the hydroperoxide group concentration per gram of rubber is determined. The specific amounts of methylene blue, and methanol employed as well as the exposure time and hydroperoxide group concentration is set forth in Table I.

TABLE I

| Run Number | Methylene blue[1] | Methanol[2] | Exposure[3] | Yield[4] |
|---|---|---|---|---|
| 1† | 100 | 0 | 1 | 0.7 |
| 2 | 100 | 5 | 1 | 9.4 |
| 3 | 123 | 10 | 1 | 10.8 |
| 4† | 1000 | 0 | 60 | 8.0 |

† For comparison purposes only, not representative of compositions produced by the claimed invention.
[1] Concentration of methylene blue in parts per million.
[2] Concentration of Methanol in weight percent based on total solution weight.
[3] Exposure time to visible light, in minutes.
[4] Hydroperoxide group concentration in micromoles of hydroperoxide per gram of rubber.

As can be seen from the above table, superior results, in terms of hydroperoxide derivative formation, are achieved through the use of a solubilizer such as methanol. The use of 5 or 10 weight percent of methanol produces more than an order of magnitude increase in the yield of hydroperoxide group concentration. A roughly equivalent concentration of hydroperoxide groups can be achieved by increasing the concentration of photosensitiving agent 10 fold in conjunction with increasing the exposure time from one minute to 60 minutes.

Clearly, the use of a solubilizer allows for a drastic reduction in the concentration of photosensitizing agent as well as a drastic reduction in exposure time. It is this improvement which allows the use of a continuous process as illustrated in Examples 3-14.

EXAMPLE 2

A solution of 95 weight percent styrene, 5 weight percent of a polybutadiene rubber (Diene 55 ®), and 100 parts per million of methylene blue is prepared. To this solution is added varying amounts of various solubilizing agents. The resulting solutions are then exposed to visible light for a period of one minute and the hydroperoxide group concentration per gram of rubber is determined.

The specific solubilizers employed and hydroperoxide group concentration is set forth in Table II.

TABLE II

| Run Number | Solubilizer | Solubilizer[1] Concentration | Yield[2] |
|---|---|---|---|
| 1† | — | 0 | 0.7 |
| 2 | Methanol | 5 | 9.4 |
| 3 | Methanol | 10 | 10.8 |
| 4 | Ethanol | 10 | 6.0 |
| 5 | Acetonitrile | 10 | 3.4 |
| 6 | Ethylacetate | 10 | 2.3 |
| 7 | Ethyleneglycol | 10 | 3.2 |
| 8 | Orthodichlorobenzene | 10 | 2.3[3] |
| 9 | Dimethylsulfoxide | 10 | 5.0 |

† For comparison purposes only, not representative of compositions produced by the claimed invention.
[1] Concentration of solubilizer in weight percent based on total solution weight.
[2] Hydroperoxide group concentration is micromoles of hydroperoxide per gram of rubber.
[3] A portion of the rubber precipitated from the solution.

As can be seen from the above table, the solubilizers claimed in the present invention all produce a hydroperoxide group concentration which is more than three times greater than the hydroperoxide group concentration produced in the absence of a solubilizer.

EXAMPLE 3

A first feed stream was prepared containing 84.5 weight percent styrene; 10.2 weight percent ethylbenzene; 5.3 weight percent Diene-55 ®, a polybutadiene rubber commercially available from the Firestone Rubber Company; and 100 parts per million (ppm) of 1,1-bis(t-butylperoxy)cyclohexane, a peroxide initiator. Forty pounds of the first feed stream was prepared.

A second feed stream was prepared containing 77.0 weight percent styrene; 10.0 weight percent ethylbenzene; 5.2 weight percent Diene-55 ®; 6.7 weight percent mineral oil; 600 ppm of 1,1-bis(t-butylperoxy)-cyclohexane; 0.75 weight percent of dilaurylthiodipropionate, an antioxidant; and 0.25 weight percent of Topanol CA ® an antioxidant commercially available from Imperial Chemical Industries. Six thousand grams of the second feed stream were prepared.

The first and second feed streams were then polymerized. The first feed stream was contained in a feed tank which discharged into a first stirred tube reactor. The first feed stream was added to the first stirred tube reactor at a rate of 495 grams/hour. The first reactor was divided into three temperature control zones which had temperatures of 109° C., 113° C., and 121° C. The first stirred tube reactor discharged into a second stirred tube reactor. The second stirred tube reactor was divided into three temperature control zones which had temperatures of 132° C., 140° C., and 146° C. The second stream was added to the second stirred tube reactor at a rate of 117 grams/hour near the end of the first feed stream's residence time in the second reactor. The second stirred tube reactor discharged into a third stirred tube reactor. The third stirred tube reactor was divided into two temperature control zones having temperatures of 151° C. and 162° C. The third stirred tube reactor discharged into a devolatilizer. The devolatilizer was maintained at a temperature of 230° C. and a vacuum of about 13 millimeters of mercury. The physical properties of the resulting polymer product are set forth in Table III.

EXAMPLE 4

A first feed stream was prepared 83.7 weight percent styrene; 10 weight percent ethylbenzene; and 5.2 weight percent Diene-55 ®. Forty pounds of the first feed stream were prepared.

A second stream was prepared containing 76.2 weight percent styrene; 10 weight ethylbenzene; 5.2 weight percent Diene-55 ®; 7.5 weight percent mineral oil; 600 ppm 1,1-bis(t-butylperoxy)cyclohexane; 0.75 weight percent dilaurylthiodipropionate; and 0.25 weight percent Topanol CA ®. Six thousand grams of the second feed stream were prepared.

The first feed stream was agitated and exposed to oxygen for about 48 hours. At the end of this time period, a solution of 1 weight percent methanol and 10 ppm methylene blue, based on total weight of the first feed stream, was added to the first feed stream.

The first feed stream was exposed to visible light. The light had a wavelength of about 400 to 700 nanometers. The feed stream was passed through a ⅜ inch Pyrex ® heavy-walled glass tube while a high pressure 100 watt sodium vapor lamp was operating about three inches from the glass tube. A segment of tube approximately 11 inches in length was exposed to the visible light. The first feed stream was then passed through a carbon bed to remove the methylene blue.

Testing indicated a hydroperoxide group concentration of about 21.0 micromoles of hydroperoxide groups per gram of rubber or about 3.0 hydroperoxide groups per rubber polymer chain. The hydroperoxide concentration was determined for this and other examples by reacting the hydroperoxide derivative with triphenyl phosphine. An amount of triphenyl phosphine was dissolved with a known amount of rubber hydroperoxide and reacted with the hydroperoxide groups to form triphenyl phosphine oxide. The amount of triphenyl phosphine oxide produced was determined by gas chromatography. In this manner, the amount of hydroperoxide per gram of rubber was determined.

The first and second feed streams were then polymerized. The first feed stream was contained in a feed tank which was charged into a first stirred tube reactor. The first feed stream was added to the first stirred tube reactor at a rate of 495 grams/hour. The first reactor was divided into three temperature control zones which had temperatures of 108° C., 113° C., and 121° C. The first stirred tube reactor discharged into a second stirred tube reactor. The second stirred tube reactor was divided into three temperature control zones which had temperatures of 130° C., 139° C., and 146° C. The second feed stream was added to the second stirred tube reactor at a rate of 115 grams/hour near the end of the first feed stream's residence time in the second reactor. The second stirred tube reactor discharged into a third stirred tube reactor. The third stirred tube reactor was divided into two temperature control zones which had temperatures of 152° C. and 164° C. The third stirred tube reactor discharged into a devolatilizer. The devolatilizer was maintained at a temperature of 230° C. and a vacuum of about 12 millimeters of mercury. The physical properties of the resultant polymer product are set forth in Table III.

EXAMPLE 5

A first feed stream was prepared containing 83.8 weight percent styrene; 10 weight ethylbenzene; 5.2 weight percent EPsyn 40A® a terpolymer rubber comprising ethylene, propylene, and 5-ethylidene-2-norbornene, commercially available from Copolymer Rubber and Chemical Corporation; and 100 ppm of 1,1-bis-(t-butylperoxy)cyclohexane. Forty pounds of the first feed stream were prepared.

A second feed stream was prepared containing 76.2 weight percent styrene; 10 weight percent ethylbenzene; 5.2 weight percent Diene-55 ®; 7.5 weight percent mineral oil; 600 ppm of 1,1-bis(t-butylperoxy)cyclohexane; 0.75 weight percent of dilaurylthiodipropionate; and 0.25 weight percent of Topanol CA ®. Six thousand grams of the second feed stream were prepared.

The first and second feed streams were agitated for about 48 hours. The first and second feed streams were then polymerized. The first feed stream was contained in a feed tank which discharged into a first stirred tube reactor. The first feed stream was added to the stirred tube reactor at a rate of 463 grams/hour. The first reactor was divided into three temperature control zones which had temperatures of 108° C., 116° C. and 122° C. The first stirred tube reactor discharged into a second stirred tube reactor. The second stirred tube reactor was divided into three temperature control zones which had temperatures of 126° C., 140° C. and 145° C. The second feed stream was added to the second stirred tube reactor at a rate of 119 grams/hour near the end of the first feed stream's residence time in the second reactor. The second stirred tube reactor discharged into a third stirred tube reactor. The third stirred tube reactor was divided into two temperature control zones having temperatures of 152° C. and 165° C. The third stirred tube reactor discharged into a devolatilizer. The devolatilizer was maintained at a temperature of 230° C. and a pressure of about 14.5 millimeters of mercury. The physical properties of the resultant polymer product are set forth in Table III.

EXAMPLE 6

A first feed stream was prepared containing 83.7 weight percent styrene; 5 weight percent ethylbenzene; 5 weight percent Isopar C ®, a solvent containing about 85 percent isooctane the balance being various paraffinic hydrocarbons, commercially available from The Exxon Oil Company; and 5.25 weight percent EPsyn 40A ®. Forty pounds of the first feed stream were prepared.

A second feed stream was prepared containing 74.0 weight percent styrene; 9.7 weight percent ethylbenzene; 2.9 weight percent Isopar C ®; 5.1 weight percent EPsyn 40A ®; 7.28 weight percent mineral oil; 583 ppm of 1,1-bis(t-butylperoxy)cyclohexane; 0.73 weight percent of dilaurylthiopropionate; and 0.24 weight percent of Topanol CA ®.

The first and second feed streams were agitated and exposed to oxygen for about 48 hours. At the end of this time period a solution of 1 weight percent methanol and 10 ppm methylene blue, based on total weight of the first and second feed streams, respectively, was added to the first and second feed streams.

The first and second feed streams were separately exposed to visible light. The light had a wavelength of 400 to 700 nanometers. The feed streams were passed through a ⅜ inch Pyrex ® heavy-walled glass tube while a high pressure, 100 watt sodium vapor lamp was operating about three inches from the glass tube. A segment of tube approximately 1.5 inches in length was exposed to the visible light. The first and second reaction streams were then passed through a carbon bed to remove the methylene blue.

Testing indicated that the first feed stream had a hydroperoxide group concentration of about 19.0 micromoles of hydroperoxide groups per gram of rubber or about 1.5 hydroperoxide groups per rubber polymer chain. The second feed stream had a hydroperoxide group concentration of about 23.0 micromoles of hydroperoxide group per gram of rubber or about 1.8 hydroperoxide groups per rubber polymer chain.

The first and second feed streams were then polymerized. The first feed stream was contained in a feed tank which discharged into a first stirred tube reactor. The first feed stream was added to the first stirred tube reactor at a rate of 447 grams/hour. The first reactor was divided into three temperature control zones which had temperatures of 110° C., 114° C. and 122° C. The first stirred tube reactor discharged into a second stirred tube reactor. The second stirred tube reactor was divided into three temperature control zones which had temperatures of 132° C., 140° C. and 146° C. The second feed stream was added to the second stirred tube reactor at a rate of 105 grams/hour near the end of the first feed stream's residence time in the second reactor. The second stirred tube reactor discharged into a third stirred tube reactor. The third stirred tube reactor was divided into two temperature control zones which had temperatures of 154° C. and 168° C. The third stirred tube reactor discharged into a devolatilizer. The devolatilizer was maintained at a temperature of 230° C. and a vacuum of about 13.5 millimeters of mercury. The physical properties of the resultant polymer product are set forth in Table III.

EXAMPLE 7

A feed stream was prepared containing 78.5 weight percent styrene; 15 weight Isopar C ®; and 5.5 weight percent EPsyn 5508 ®, a terpolymer comprising ethylene, propylene, and 5-ethylidene-2-norbornene. The feed stream was agitated and exposed to oxygen for about 46 hours. At the end of this time period, a solution of 1 weight percent methanol and 10 ppm methylene blue, based on total feed stream weight, was added to the feed stream. The feed stream was then polymerized. The feed stream was contained in a feed tank which discharged into a first stirred tube reactor. The feed stream was added to the first stirred tube reactor at a rate of 640 grams per hour. The first reactor was divided into three temperature control zones which had temperatures of 120° C., 124° C. and 133° C. The first stirred tube reactor discharged into a second stirred tube reactor. The second stirred tube reactor was divided into three temperature control zones having temperatures of 140° C., 147° C. and 150° C. The second stirred tube reactor discharged into a third stirred tube reactor. The third stirred tube reactor was divided into two temperature control zones having temperatures of 158° C. and 166° C. The third stirred tube reactor discharged into a devolatilizer. The devolatilizer was maintained at a temperature of 235° C. and a vacuum of about 30 millimeters of mercury.

A blend of the resultant polystyrene product and polyethylene was prepared. The blend comprised 36 weight percent, based on total blend weight, of the polystyrene product prepared in the above process and 64 weight percent based on total blend weight of HDPE 12065 ®, a high density polyethylene having a density of 0.965 grams/cm³, commercially available from The Dow Chemical Company. The two components of the blend were melt blended together on a two-roll mill mixer having front and back roll temperatures of about 185° C. and 150° C., respectively. The physical properties of the resultant blend are set forth in Table III.

EXAMPLE 8

A feed stream was prepared containing 78.5 weight percent styrene; 15 weight percent Isopar C ®; and 5.5 weight percent EPsyn 5508 ®. The feed stream was agitated and exposed to oxygen for about 46 hours. At the end of this time period, a solution of 1 weight percent methanol and 10 ppm methylene blue, based on total feed stream weight, was added to the feed stream. Forty-five pounds of the feed stream were prepared.

The feed stream was exposed to visible light. The light had a wavelength of about 400 to 700 nanometers. The feed stream was passed through ⅜ inch Pyrex ® heavy-walled glass tube while a high pressure 100 watt sodium vapor lamp was operating about four inches from the glass tube. A section of tube approximately 11 inches in length was exposed to the visible light. The feed stream was then passed through a carbon bed to remove the methylene blue. Testing indicated a hydroperoxide group concentration of about 24 micromoles of hydroperoxide groups per gram of rubber or about 1.8 hydroperoxide groups per rubber polymer chain.

The feed stream was then polymerized. The feed stream was contained in a feed tank which discharged into a first stirred tube reactor. The first feedstream was added to the first stirred tube reactor at a rate of 640 grams/hour. The first reactor was divided into three temperature control zones which had temperature of 117° C., 123° C. and 132° C. The first stirred tube reactor discharged into a second stirred tube reactor. The second stirred tube reactor was divided into three temperature control zones which had temperatures of 141° C., 145° C. and 149° C. The second stirred reactor discharged into a third stirred tube reactor. The third stirred tube reactor was divided into two temperature control zones having temperatures of 157° C. and 164° C. The third stirred tube reactor discharged into a devolatilizer. The devolatilizer was maintained at a temperature of 235° C. and a vacuum of about 30 millimeters of mercury.

A blend of the resulting polystyrene product and polyethylene was prepared. The blend comprised 36 weight percent, based on total blend weight, of the polystyrene product produced through the above process and 64 weight percent, based on total blend weight, of HDPE 12065, a high density polyethylene having a density of 0.965 grams/cm³ commercially available from The Dow Chemical Company. The two components of the blend were melt blended together a two-roll mill mixer having front and back roll temperatures of about 185° C. and 150° C., respectively. The physical properties of the resulting blend are set forth in Table III.

EXAMPLE 9

A first feed stream was prepared containing 52.3 weight percent styrene; 19.7 weight percent ethylbenzene; 18.7 weight percent acrylonitrile; 8.4 weight percent Diene-55 ®; and 250 ppm normal dodecylmercaptan. A second feed stream was prepared containing 97.7 weight percent ethylbenzene; 1.3 weight percent Irganox 1076 ®, an antioxidant commercially from the Ciba-Geigy Corporation; and 1.0 weight percent of normal dodecylmercaptan.

The first feed stream was agitated and exposed to oxygen for about 16 hours. At the end of this time period 0.86 weight percent of a photosensitizing solution was added to the first feed stream. The photosensitizing solution contained 0.1 weight percent methylene blue and 99.9 weight percent methanol. Approximately 4 hours after the addition of the photosensitizing solution to the first feed stream, the first and second feed streams were polymerized.

The first feed stream was contained in a feed tank which discharged into a first stirred tube reactor. The first feed stream was added to the first stirred tube reactor at a rate of 415 grams/hour. The first reactor was divided into three temperature control zones which had temperatures of 120° C., 123° C., and 127° C. The first stirred tube reactor discharged into a second stirred tube reactor. The second stirred tube reactor was divided into two temperature control zones which had temperatures of 130° C. and 134° C. The second feed stream was added to the second stirred tube reactor at the rate of 35 grams/hour. The second stirred tube reactor discharged into a third stirred tube reactor. The third stirred tube reactor was divided into two temperature control zones having temperatures of 144° C. and 158° C. The third stirred tube reactor discharged into a devolatilizer. The devolatilizer was maintained at a temperature of 230° C. and a vacuum of about 30 millimeters of mercury. The physical properties of the resultant polymer product are set forth in Table III.

EXAMPLE 10

A first feed stream was prepared containing 52.3 weight percent styrene; 19.7 weight percent ethyl benzene; 18.7 weight percent acrylonitrile; 8.4 weight percent Diene-55 ®; and 250 ppm normal dodecylmercaptan.

A second feed stream was prepared containing 97.7 weight percent ethylbenzene; 1.3 weight percent Irganox 1076 ®; and 1.0 weight percent normal dodecylmercaptan. The first feed stream was agitated and exposed to oxygen for about 16 hours. At the end of this time period, 0.86 weight percent of a photosensitizing solution was added to the first feed stream.

The photosensitizing solution comprised 0.1 weight percent methylene blue and 99.9 weight percent methanol.

Approximately four hours after the addition of the photosensitizing agent to the first feed stream, the first feed stream was exposed to visible light. The light had a wavelength of about 400 to about 700 nanometers. The feedstream was passed through a ⅜ inch Pyrex ® heavy-walled glass tube while a high pressure 400 watt sodium vapor lamp was operating about three inches from the glass tube. A segment of tube approximately 13 inches in length was exposed to the visible light. The first feed stream was then passed through a carbon bed to remove the methylene blue.

Testing indicated a hydroperoxide group concentration of from about 8.2 to about 10.6 micromoles of hydroperoxide groups per gram of rubber or about 1.2 to about 1.5 hydroperoxide groups per rubber polymer chain.

The first and second feed streams were then polymerized. The first feed stream was contained in a feed tank which discharged into a first stirred tube reactor. The first feed stream was added to the first stirred tube reactor at a rate of 420 grams/hour. The first reactor was divided into three temperature control zones which had temperatures of 113.5° C., 116° C. and 118.5° C. The first stirred tube reactor discharged into a second stirred tube reactor. The second stirred tube reactor was divided into two temperature control zones which had temperatures of 128° C. and 134° C. The second feed stream was added to the second stirred tube reactor at a rate of 33 grams/hour. The second stirred tube reactor discharged into a third stirred tube reactor. The third stirred tube reactor was divided into two temperature control zones having temperatures of 144° C. and 156° C. The third stirred tube reactor discharged into a devolatilizer. The devolatilizer was maintained at a temperature of 230° C. and a vacuum of about 30 millimeters of mercury. The physical properties of the resultant polymer product are set forth in Table III.

EXAMPLE 11

A first feed stream was prepared containing 53.9 weight percent styrene; 20 weight percent ethylbenzene; 18 weight percent acrylonitrile; 7.9 weight percent Diene-55 ®; 0.01 weight percent normal dodecylmercaptan; and 0.12 weight percent of 1,1-bis(t-butylperoxide)cyclohexane.

A second feed stream was prepared containing 69.3 weight percent ethylbenzene; 7.4 weight percent acrylonitrile; 22.3 weight percent styrene; and 1.0 weight percent normal dodecylmercaptan.

The first feed stream was agitated and exposed to oxygen for about 30 hours. At the end of this time, the first and second feed streams were polymerized. The first feed stream was contained in a feed tank which discharged into a first stirred tube reactor. The first feed stream was added to the first stirred tube reactor at a rate of 429 grams/hour. The first reactor was divided into three temperature control zones which had temperatures of 104° C., 105.5° C., and 111° C. The first stirred tube reactor discharged into a second stirred tube reactor. The second stirred tube reactor was divided into two temperature control zones which had temperatures of 114° C. and 127° C. The second feed stream was added to the second stirred tube reactor at a rate of 45.5 grams/hour. The second stirred tube reactor discharged into a third stirred tube reactor. The third stirred tube reactor was divided into two temperature control zones having temperatures of 141° C. and 149° C. The third stirred tube reactor discharged into a devolatilizer. The devolatilizer was maintained at a temperature of 230° C. and a vacuum of about 35 millimeters of mercury. The physical properties of the resulting polymer product are set forth in Table III.

EXAMPLE 12

A first feed stream was prepared containing 53.9 weight percent styrene; 20 weight percent ethylbenzene; 18 weight percent acrylonitrile; 7.9 weight percent Diene-55 ®; 0.01 weight percent normal dodecylmercaptan; and 0.12 weight percent 1,1-bis(t-butylperoxy)cyclohexane.

A second feed stream was prepared containing 69.3 weight percent ethylbenzene; 7.4 weight percent acrylonitrile; 22.3 weight percent styrene; and 1.0 weight percent normal dodecylmercaptan. The first feed stream was agitated and exposed to oxygen for about 30 hours. At the end of this time, 400 grams of a photosensitizing solution was added to the first feed stream. The photosensitizing solution contained 0.1 weight percent methylene blue and 99.9 weight percent methanol.

The first feed stream was exposed to visible light. The light had a wavelength of about 400 to 700 nanometers. The feed stream was passed through a ⅜ inch Pyrex ® heavy-walled glass tube while a high pressure 100 watt sodium vapor lamp was operating about three inches from the glass tube. A segment approximately 13 inches in length was exposed to the visible light. The first feed stream was then passed through a carbon bed to remove the methylene blue.

Testing indicated a hydroperoxide group concentration of about 8.3 micromoles of hydroperoxide groups per gram of rubber or about 1.2 hydroperoxide groups per rubber polymer chain.

The first and second feed streams were then polymerized. The first feed stream was contained in a feed tank which discharged into a first stirred tube reactor. The first feed stream was added to the first stirred tube reactor at a rate of 431 grams/hour. The first reactor was divided into three temperature control zones which had temperatures of 100° C., 101° C. and 105° C. The first stirred tube reactor discharged into a second stirred tube reactor. The second stirred tube reactor was divided into two temperature control zones which had temperatures of 114° C. and 122° C. The second feed stream was added to the second stirred tube reactor at a rate of 46 grams/hour. The second stirred tube reactor discharged into a third stirred tube reactor. The third stirred tube reactor was divided into two temperature control zones having temperatures of 135° C. and 155° C. The third stirred tube reactor discharged into a devolatilizer. The devolatilizer was maintained at a temperature of 230° C. and a vacuum of about 35 millimeters of mercury. The physical properties of the resultant polymer product are set forth in Table III.

EXAMPLE 13

A first feed stream was prepared containing 61.0 weight percent styrene; 6.6 weight percent acrylonitrile; 22.3 weight percent Isopar C ®; and 9.1 weight percent EPsyn 55 ®, a terpolymer rubber comprising ethylene, propylene, and 5-ethylidene-2-norbornene, commercially available from The Copolymer Rubber and Chemical Corporation.

A second feed stream was prepared containing 37.6 weight percent acrylonitrile; 61.4 weight percent cyclohexanone; 0.53 weight percent Irganox 1076 ®; 0.056 weight percent of 1,1-bis(t-butylperoxy)cyclohexane; and 0.37 weight percent normal dodecylmercaptan.

The first feed stream was agitated and exposed to oxygen for about 16 hours. At the end of this time period, 1 weight percent of a photosensitizing solution was added to the first feed stream. The photosensitizing solution contained 0.1 weight percent methylene blue and 99.9 weight percent methanol. Approximately four hours after the addition of the photosensitizing solution to the first feed stream, the first and second feed streams were polymerized. The first feed stream was contained in a feed tank which discharged into a first stirred tube reactor. The first feed stream was added to the first stirred tube reactor at a rate of about 400 grams/hour. The first stirred tube reactor was divided into three temperature control zones which had temperatures of 119° C., 123° C. and 125° C. The first stirred tube reactor discharged into a second stirred tube reactor. The second stirred tube reactor was divided into two temperature control zones which had temperatures of 115° C. and 122° C. The second feed stream was added to the second stirred tube reactor at a rate of 146 grams/hour. The second stirred tube reactor discharged into a third stirred tube reactor. The third stirred tube reactor was divided into two temperature control zones having temperatures of 134° C. and 151° C. The third stirred tube reactor discharged into a devolatilizer. The devolatilizer was maintained at a temperature of 226° C. and a vacuum of about 60 to 65 millimeters of mercury. The physical properties of the resultant polymer product are set forth in Table III.

EXAMPLE 14

A first feed stream was prepared containing 61.0 weight percent styrene; 6.6 weight percent acrylonitrile; 22.3 weight percent Isopar C ®; and 9.1 weight percent EPsyn 55 ®.

A second feed stream was prepared containing 37.6 weight percent acrylonitrile; 61.4 weight percent cyclohexanone; 0.53 weight percent Irganox 1076 ®; 0.056 weight percent of 1,1-bis(t-butylperoxy)cyclohexane; and 0.37 weight percent normal dodecylmercaptan.

The first feed stream was agitated and exposed to oxygen for about 16 hours. At the end of this time period, 1 weight percent of a photosensitizing solution was added to the first feed stream. The photosensitizing solution contained 0.1 weight percent methylene blue and 99.9 weight percent methanol.

The first feed stream was exposed to visible light. The light had a wavelength of about 400 to 700 nanometers. The feed stream was passed through a ⅜ inch Pyrex ® heavy-walled glass tube while a high pressure 100 watt sodium vapor lamp was operating about 3 inches from the glass tube. A segment of tube approximately 13 inches in length was exposed to the visible light. The first feed stream was then passed through a carbon bed to remove the methylene blue.

Testing indicated a hydroperoxide group concentration of about 10.0 micromoles of hydroperoxide groups per gram of rubber or about 0.9 hydroperoxide groups per rubber polymer chain.

The first and second feed streams were then polymerized. The first feed stream was contained in a feed tank which discharged into a first stirred tube reactor. The first feed stream was added to the first stirred tube reactor at a rate of 400 grams/hour. The first reactor was divided into three temperature control zones which had temperatures of 97° C., 105° C. and 111° C. The first stirred tube reactor discharged into a second stirred tube reactor. The second stirred tube reactor was divided into two temperature control zones which had temperatures of 109° C. and 115° C. The second feed stream was added to the second stirred tube reactor at a rate of 146 grams/hour. The second stirred tube reactor discharged into a third stirred tube reactor. The third stirred tube reactor had two temperature control zones which had temperatures of 135° C. and 145° C. The third stirred tube reactor discharged into a devolatilizer. The devolatilizer was maintained at a temperature of 235° C. and a vacuum of about 45 millimeters of mercury. The physical properties of the resultant polymer product are set forth in Table III.

TABLE III

| Example No. | Percent Rubber | Melt Flow Rate[1] (g/10 min) | Vicat[2] (°F.) | Izod[3] (ft lb/ inch notch) | Tmod[4] × $10^5$ psi) | Ty[5] (psi) | Tr[6] (psi) | % E[7] | Rubber Particle Size[8] (Micron) (Volume Average Diameter) |
|---|---|---|---|---|---|---|---|---|---|
| 3† | 7.3 | 31.2 | 219.0 | 1.40 | 2.55 | 2817 | 2681 | 44.4 | 2.46 |
| 4 | 6.8 | 3.0 | 218.8 | 1.37 | 3.47 | 3699 | 3116 | 31.9 | 1.92 |
| 5† | 6.7 | 6.67 | 217.8 | 0.21 | 4.04 | 4069 | 2979 | 17.7 | * |
| 6 | 6.5 | 4.0 | 218.0 | 0.94 | 3.39 | 3979 | 2845 | 24.9 | * |
| 7† | 7.8†† | * | * | 0.34 | 2.64 | 3524 | 3467 | 3.7 | * |
| 8 | 7.9†† | * | * | 1.40 | 2.51 | 3440 | 2371 | 83.0 | * |
| 9† | 12.6 | 2.9 | 232.5 | 1.8 | 2.8 | 4175 | 3910 | 43.0 | * |
| 10 | 12.5 | 2.29 | 232.8 | 3.35 | 2.8 | 4195 | 4275 | 50.4 | * |
| 11† | 11.5 | 1.7 | * | 2.3 | 2.8 | 6185 | 4780 | 16.7 | 1.24 |
| 12 | 11.8 | 1.9 | * | 4.1 | 2.7 | 6400 | 5000 | 10.7 | 0.91 |
| 13† | 13.9 | 6.1 | * | 0.4 | * | 5500 | 5400 | 5.5 | * |
| 14 | 14.0 | 4.1 | * | 2.7 | * | 6200 | 5700 | 5.6 | 0.81 |

Notes:
† For comparison purposes only, not representative of compositions produced by the claimed invention.
†† Rubber in polystyrene product before blending with polyethylene.
*Data not available.
[1]Melt Flow Rate in grams per 10 minutes as measured by ASTM D-1238, Condition 200/5.0.
[2]Vicat Heat Distortion in degrees Fahrenheit as measured by ASTM D-1525.
[3]Izod Impact Strength in foot pounds per inch of notch as measured by ASTM D-256.
[4]Tensile Modulus in pounds per square inch as measured by ASTM D-638.
[5]Tensile Yield in pounds per square inch as measured by ASTM D-638.
[6]Tensile Rupture in pounds per square inch as measured by ASTM D-638.
[7]Percent Elongation as measured by ASTM D-638.
[8]Rubber Particle Size in microns, volume average diameter.

The even number examples in Table III are for comparison only and are comparable to the immediately following odd numbered example, (e.g., Example 3 is comparable to Example 4, Example 5 compares to Example 6, etc.).

As can be readily seen from the data set forth in Table I, the process of the present invention provides a product with substantially improved physical properties. Note that for each pair of comparable examples (3-4, 5-6, etc.) there is improvement in the Izod Impact Strength and/or Tensile Properties (tensile modulus, tensile yield, and tensile rupture) for the example run according to the process of the present invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the following claims.

What is claimed is:

1. An improved process for the preparation of hydroperoxide derivatives of rubbery polymers having allylic hydrogen via singlet oxygen reaction, the steps of the process comprising:
    (a) forming a solution of a rubbery polymer having allylic hydrogen;
    (b) adding to the rubber-containing solution of step (a) a photosensitizing amount of photosensitizing agent which is not completely soluble in said rubber-containing solution;
    (c) oxygenating the rubber-containing solution; and
    (d) exposing the oxygenated rubber-containing solution of light having a wavelength between 3,000 and 8,000 Angstroms to convert triplet oxygen to singlet oxygen and thereby form a hydroperoxide derivative of said rubber polymer, wherein the improvement comprises adding to the rubber-containing solution an amount of solubilizer sufficient to solubilize the photosensitizing agent in the rubber-containing solution and wherein the solubilizer increases the yield of hydroperoxide groups formed on the rubbery-polymer by a factor of at least 3.

2. The improved process of claim 1 wherein the rubber-containing solution comprises a monovinylidene aromatic monomer.

3. The improved process of claim 1 wherein the rubber-containing solution comprises a monovinylidene aromatic monomer and one or more monomers copolymerizable therewith.

4. The improved process of claim 1 wherein the rubber-containing solution comprises styrene and acrylonitrile.

5. The improved process of claim 4 wherein the weight ratio of styrene to acrylonitrile varies from about 95 to 5 to about 40 to 60.

6. The improved process of claim 1 wherein the rubber-containing solution comprises methyl methacrylate.

7. The improved process of claim 1 wherein the rubber-containing solution comprises styrene and methyl methacrylate.

8. The improved process of claim 1 wherein the rubbery polymer is a diene rubber.

9. The improved process of claim 8 wherein the diene rubber is polybutadiene.

10. The improved process of claim 1 wherein the rubbery polymer is a block copolymer of styrene and butadiene.

11. The improved process of claim 1 wherein the rubbery polymer is a terpolymer of a first α-olefin monomer, a second different α-olefin monomer, and a non-conjugated diolefin monomer, said first α-olefin monomer having from 2 to 4 carbon atoms, said second α-olefin monomers having from 3 to 16 carbon atoms and being different than the first α-olefin monomer.

12. The improved process of claim 11 wherein the first α-olefin monomer is ethylene.

13. The improved process of claim 12 wherein the second α-olefin is propylene.

14. The improved process of claim 13 wherein the non-conjugated diolefin monomer is 5-ethylidene-2-1-norbornene.

15. The improved process of claim 1 wherein the photosensitizing amount of photosensitizing agent is from about $1 \times 10^{-4}$ to about $1 \times 10^{-1}$ weight percent based on total rubber-containing polymerizable solution.

16. The improved process of claim 1 wherein the photosensitizing agent is selected from the group consisting of methylene blue, Rose Bengal, Eosin Y, and Erythrosin B.

17. The improved process of claim 1 wherein the photosensitizing agent is methylene blue.

18. The improved process of claim 1 wherein the solubilizer is selected from the group consisting of methanol, ethanol, acetonitrile, ethylacetate, acrylonitrile, ethylene glycol, orthodichlorobenzene and dimethylsulfoxide.

19. The improved process of claim 1 wherein the solubilizer is methanol.

20. The improved process of claim 1 wherein the solubilizer is present in amounts of from about 0.1 to about 20 weight percent based on total weight rubber-containing polymerizable solution.

21. The improved process of claim 19 wherein the methanol is present in an amount of from about 0.5 to about 5 weight percent based on total weight rubber-containing polymerizable solution.

22. The improved process of claim 1 wherein the oxygenated rubber-containing polymerizable solution has dissolved therein at least about 2 micromoles of oxygen for each gram of rubbery polymer in the rubber-containing polymerizable solution.

23. The improved process of claim 1 wherein the light is visible light.

24. The improved process of claim 1 wherein from about 0.5 to about 4 hydroperoxide groups are formed on each rubbery polymer chain.

25. The improved process of claim 1 wherein the photosensitizing agent is methylene blue and the solubilizer is methanol.

26. An improved process for the preparation of hydroperoxide derivatives of rubbery polymers having allylic hydrogen, the steps of the process comprising:
    (a) forming a solution of a rubbery polymer having allylic hydrogen;
    (b) oxygenating the rubber-containing solution;
    (c) adding to the rubber-containing solution a photosensitizing amount of a photosensitizing agent which is not completely soluble in said rubber-containing solution; and
    (d) exposing the oxygenated rubber-containing solution to light having a wavelength between 3,000 and 8,000 Angstroms to convert triplet oxygen to singlet oxygen and thereby form a hydroperoxide derivative of said rubbery polymer, wherein the improvement comprises adding to the rubber containing solution an amount of a solubilizer sufficient to solubilize the photosensitizing agent in the rubber containing solution and wherein the solubilizer increases the yield of hydroperoxide groups formed on the rubbery polymer by a factor of a least 3.

27. The improved process of claim 26 wherein the solubilizer is selected from the group consisting of methanol, ethanol, acetonitrile, ethylacetate, acrylonitrile, ethylene glycol, orthodichlorobenzene and dimethylsulfoxide.

28. The improved process of claim 26 wherein the photosensitizing agent is methylene blue and the solubilizer is methanol.

29. An improved process for the formation of grafted rubbery polymers of hydroperoxidized rubbery polymer intermediates, the steps of the process comprising:

(a) forming a mixture comprising (i) a solution of a rubbery polymer having allylic hydrogen in one or more free radically polymerizable monomer(s), (ii) oxygen, and (iii) an amount of a photosensitizing agent which is not completely soluble in said solution;

(b) exposing the mixture to light having a wavelength between 3,000 and 8,000 Angstroms to convert triplet oxygen to singlet oxygen and thereby form a hydroperoxidized derivative of said rubbery polymer; and (c) polymerizing the free radically polymerizable monomer(s), wherein the improvement comprises adding to the mixture an amount of a solubilizer sufficient to solubilize the photosensitizing agent and to thereby increase the yield of hydroperoxide groups formed on the rubbery polymer by a factor of at least 3.

30. The process of claim 29 wherein the photosensitizing agent is methylene blue and the solubilizer is methanol.

* * * * *

UNITED STATES PATENT AND TRADEMARK OFFICE
CERTIFICATE OF CORRECTION

PATENT NO. : 5,075,347
DATED : December 24, 1991
INVENTOR(S) : Alan E. Platt; Jerry L. Hahnfeld; David A. Haberman It is certified that error appears in the above-indentified patent and that said Letters Patent is hereby corrected as shown below:

Title page, Line 13 of Abstract, "mixutre" should read --mixture--

Column 17, Line 24, "rubber polymer" should read --rubbery polymer--

Column 18, Line 2, "5-ethylidene-2-1" should read -- 5-ethylidene-2- --

Signed and Sealed this

Twenty-third Day of November, 1993

Attest:

BRUCE LEHMAN

*Attesting Officer*    *Commissioner of Patents and Trademarks*